April 11, 1967 A. C. KIRILOUCKAS 3,313,561

KNOB ASSEMBLY FOR TAPE RECORDER

Filed Jan. 4, 1965

INVENTOR:
Albert C. Kirilouckas
By Keith D. Beecher
Attorney 3,313,561

KNOB ASSEMBLY FOR TAPE RECORDER

Albert C. Kirilouckas, Granada Hills, Calif., assignor to Winston Research Corporation, Los Angeles, Calif., a corporation of California Filed Jan. 4, 1965, Ser. No. 422,922
4 Claims. (Cl. 287—52.07)

The present invention relates to an improved hold-down assembly which may be used, for example, for holding magnetic tape reels on a drive shaft against a turntable, or other appropriate support, and which may have general utility.

As is well known, in most magnetic tape recorders, the magnetic tape is wound on a first reel. The first reel usually is removably supported on a shaft which extends outwardly from a vertical turntable, or other support, the turntable being keyed to the reel, so that when it turns, the reel also turns to permit the tape to be drawn through the tape recorder mechanism.

A second reel is usually mounted on the tape recorder in the same way, and this second reel is turned so that the magnetic tape may be drawn along a selected path through the recorder mechanism and wound on the second reel. The first reel is usually referred to as the pay-out reel, and the second reel is usually referred to as the take-up reel.

An object of the present invention is to provide an improved hold-down assembly which, as mentioned above, serves removably to hold the pay-out reel and the take-up reel on their respective shafts, and against their respective turntables, or other support members, in a manner such that either of the reels may be readily removed, and yet which serves to hold the reels firmly in place.

The improved hold-down assembly of the invention is advantageous in that it may be operated simply by pushing it into place against the reel, which causes the assembly to lock on the shaft and hold the reel firmly in place. Then, a simple pulling action on the hub assembly causes it to release from the shaft, so that it and the corresponding reel may be removed from the shaft.

A feature of the hold-down assembly of the invention is that it is simple in its construction and inexpensive in cost, and yet it is rugged and extremely reliable in operation.

Other features and advantages of the invention will become apparent from a consideration of the following description, when the description is taken in conjunction with the accompanying drawing, in which.

Figures 1, 2, 3, 4:
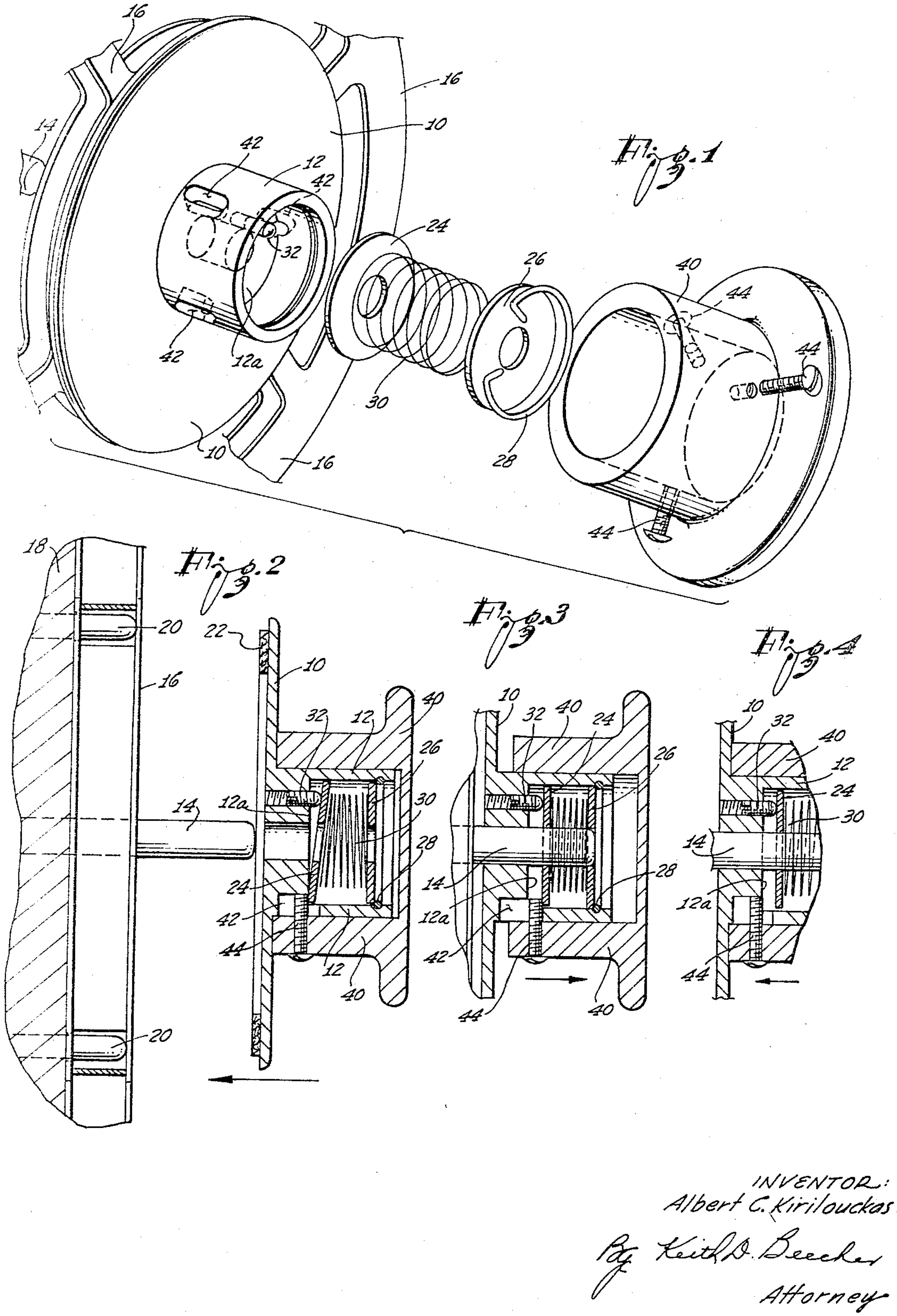
FIGURE 1 is an exploded perspective view of a hold-down assembly constructed in accordance with the concepts of the invention.
FIGURE 2 is a side sectional view of the hold-down assembly, and illustrating the assembly about to be moved over a supporting shaft.
FIGURE 3 is a side sectional view of the hold-down assembly, supported on the shaft, and moved outwardly, so that it may be withdrawn from the shaft.
FIGURE 4 shows the hold-down assembly on the shaft, and moved inwardly so that it can be pushed into place on the shaft against the reel to be supported thereby.

The hold-down assembly of the invention includes a base 10 which, as illustrated, may be in the form of a thin disc. The base 10 includes a hub portion 12 which is hollow, and which may be formed integral with the base 10, as shown, for example, in FIGURE 2. The base 10 has a central aperture, and it is intended to be received on a shaft 14. The shaft 14 extends through the central aperture in the base 10, when the knob assembly is in place.

The assembly may be freely moved along the shaft 14 to the left (FIGURE 4) so as to move against and support a reel 16. It then locks and holds the reel against its turntable 18, or other support. The assembly may be released by a pulling action (FIGURE 3) to be described.

The turntable 18 is keyed to the reel, for example, by pins 20. It will be appreciated that as the turntable 18 is rotated, the reel 16, and hold-down assembly on the shaft 14 will each rotate. An annular resilient member 22 (composed of felt, for example) may be interposed between the base 10 and the face of the reel 16 so that the assembly may be firmly held in a locked position.

A pair of ring-like retainer discs 24 and 26, each with a central aperture, are supported within the interior of the hollow hub portion 12, and these retainer discs are held in place, for example, by means of a usual resilient clip 28. A coil spring 30 is disposed in the hollow hub between the retainer discs 24 and 26, and this spring serves to bias the retainer disc 26 against the clip 28, and it also serves to bias the retainer disc 24 against a rear shoulder **12*a* formed by the hub portion 12**.

A stud 32 is threaded through the base 10 and through the aforesaid shoulder **12*a*, so that its extremity protrudes slightly from the front surface of the shoulder. Therefore, when the retainer member 24 is biased against the shoulder 12*a* by the spring 30, the stud 32** causes it to cock, as shown in FIGURE 2.

A hollow knob 40 is fitted over the hub portion 12 in telescopic coaxial relationship with the hub portion. The knob may be moved manually back and forth, in the longitudinal direction, on the hub portion.

The hub portion 12 includes, in the illustrated embodiment, three longitudinally extending slots 42 which are positioned at equidistant angular locations about its peripheral wall. These slots receive corresponding studs, or screws, 44 which extend radially through the knob 40 and through the slots 42 to extend adjacent a surface of the disc 24. The screws 44 are disposed in a uniplanar relationship (only one of the screws is shown in FIGURES 2, 3 and 4), and they serve to move the retainer disc 24 away from the shoulder **12*a* and cocking stud 32, when the knob 40 is moved to the right on the hub 12, as shown in FIGURE 3. This action uncocks the retainer disc 24 so that the knob assembly, and the supported reel 16, may easily be removed from the shaft 14**.

When the hold-down assembly of the invention is moved onto the shaft 14 (FIGURE 4), the shaft enters the central aperture in the retainer disc 24, and it tends to move the retainer disc away from the shoulder **12*a* against the bias of the spring 30. This action causes the retainer disc 24 to assume a generally uncocked position, so that the shaft 14 may move through its central aperture, and into the central aperture in the retainer disc 26. However, when the knob assembly is moved in place against the resilient member 22 adjacent the reel 16, the spring 30 then biases the retainer 24 into the cocked position shown in FIGURE 2, and the resilient member 22** firmly holds the assembly in this position. Any tendency for right hand movement of the knob assembly on the shaft is thereby prevented, and the knob assembly is firmly locked on the shaft so as to hold the reel in place.

Therefore, in order to move the knob assembly into position, it is merely slipped over the supporting shaft 14 and against the resilient member 22 to be supported on the shaft. When it engages the member 22, it locks against the shaft, and it remains locked, until the knob 40 is pulled away from the base 10. This pulling of the knob 40 causes the screws, such as the screw 44, to move the retainer disc 24 against the bias of the spring 30 to an uncocked position, to permit the removal of the assembly.

The invention provides, therefore, an extremely simple hold-down knob assembly which may be operated in the most convenient manner, so as to removably hold a reel, or other member, on a shaft.

While a particular embodiment of the invention has been described, modifications may be made. It is intended in the claims to cover all modifications which come within the scope of the invention.

What is claimed is:

1. A hold-down assembly for releasably supporting a reel, or the like, on a shaft, said assembly including: a disc-like base member having a central aperture therein and including a hollow hub portion coaxial with said aperture, said hub portion having at least one longitudinally extending slot formed in the peripheral wall thereof, and said hub portion defining an internal shoulder adjacent said disc-like base member; a hollow knob fitted over said hub portion in coaxial telescopic sliding relationship therewith; at least one retainer disc housed in said hub portion and having a central aperture for receiving said shaft when the base member and hub portion are moved over said shaft; resilient means mounted in said hub portion for resiliently biasing said retainer disc against said shoulder; a first stud extending longitudinally through said base member and through said shoulder normally to engage said retainer disc to cock said retainer disc so as to hold the hub assembly locked on said shaft; and at least one stud extending radially through said knob and through said slot in the peripheral wall of said hub portion to engage and move said retainer disc away from said shoulder and uncock said retainer disc when said knob is moved away from said base member so as to unlock the assembly from the shaft and permit it to be removed from the shaft.

2. The hold-down assembly defined in claim 1 in which said hub portion has a plurality of longitudinally extending slots formed in the peripheral wall thereof at spaced angular positions thereon; and which includes a plurality of studs extending radially in uniplanar relationship through said knob and through corresponding ones of said slots to engage and move said retainer disc away from said shoulder so as to uncock said retainer discs when said knob is moved away from said base member.

3. The hold-down assembly defined in claim 1 in which said resilient means comprises a coil spring coaxially mounted in said hub portion.

4. A hold-down assembly for releasably supporting a reel, or the like, on a shaft extending outwardly from a support member for said reel, said assembly, including: a disc-like apertured base member including a hollow hub portion having a plurality of longitudinally extending slots formed therein at spaced angular positions about the periphery thereof; a hollow knob fitted over said hub portion of said base member in telescopic sliding relationship therewith; a pair of apertured discs housed in said hub portion in axial alignment to receive said shaft when said apertured base member and said hollow hub portion are moved over said shaft; spring means mounted in said hub portion and interposed between said discs to maintain said discs in spaced relationship in said hub; a first stud member extending longitudinally through said base member into engagement with a first of said apertured discs normally to cock said first apertured disc so as to hold the hub assembly locked on said shaft; and a plurality of further stud members extending in uniplanar relationship radially through said knob and through corresponding ones of said slots in said hub portion to engage and uncock said first apertured disc when said knob is moved longitudinally away from said base member so as to unlock the assembly from the shaft and permit it to be removed therefrom.

References Cited by the Examiner

UNITED STATES PATENTS

| | | | |
|---|---|---|---|
| 1,307,937 | 6/1919 | Straub | 279—29 |
| 2,331,647 | 10/1943 | Barkstrom et al. | 287—52 |
| 2,442,779 | 6/1948 | Oriold | 248—410 |
| 2,806,723 | 9/1957 | Fairclough | 287—58 |

FOREIGN PATENTS

| | | |
|---|---|---|
| 253,383 | 9/1959 | Australia. |

CARL W. TOMLIN, *Primary Examiner.*

A. V. KUNDRAT, *Assistant Examiner.*